United States Patent [19]

Rüegg

[11] 4,116,599

[45] Sep. 26, 1978

[54] DEVICE FOR ANCHORING AN INJECTION MOLDING MACHINE TOOL PART TO A TOOL CARRIER

[75] Inventor: Edwin Rüegg, Netstal, Switzerland

[73] Assignee: Netstal-Maschinen AG, Switzerland

[21] Appl. No.: 807,668

[22] Filed: Jun. 17, 1977

[30] Foreign Application Priority Data

Jun. 29, 1976 [CH] Switzerland ............... 8287/76

[51] Int. Cl.² .......................................... B29F 1/00
[52] U.S. Cl. .......................... 425/192 R; 425/193; 425/595
[58] Field of Search ............... 425/192, 193, 595, 542, 425/453

[56] References Cited

U.S. PATENT DOCUMENTS

| | | | |
|---|---|---|---|
| 3,321,805 | 5/1967 | Given | 425/192 |
| 3,394,434 | 7/1968 | Hart-Still | 425/193 |
| 3,528,134 | 9/1970 | Fischbach | 425/595 X |
| 3,540,081 | 11/1970 | Carrieri et al. | 425/595 X |

*Primary Examiner*—Robert L. Spicer, Jr.
*Attorney, Agent, or Firm*—McGlew and Tuttle

[57] ABSTRACT

A tool carrier mechanism for injection molding machines for securing a tool part to a tool carrier, comprises a guide bolt having means for connecting it to the tool part so that it projects outwardly from the rear of the tool part. A tool carrier has a bore therethrough for receiving the guide bolt and has a front face against which the rear of the tool part is engageable and has an opposite rear face beyond which said guide bolt projects. A slide mounted on the tool carrier adjacent the rear face of the tool carrier is movable toward and away from the guide bolt for engagement and disengagement therefrom. Wedge surfaces are defined between the guide bolt and said slide effecting an inward movement of the guide bolt with the tool part to exert an inward pressure engagement of the tool part with the tool carrier.

4 Claims, 5 Drawing Figures

DEVICE FOR ANCHORING AN INJECTION MOLDING MACHINE TOOL PART TO A TOOL CARRIER

FIELD AND BACKGROUND OF THE INVENTION

This invention relates in general to injection molding machines and, in particular, to a new and useful device for effectively and readily mounting an injection molding machine tool part to a tool carrier.

DESCRIPTION OF THE PRIOR ART

The present invention relates to a tool carrier mechanism which includes securing means for the tool parts. In tool carrier mechanisms of the prior art which usually comprise two plate-shaped tool carriers, wherein one of the carriers is movable and wherein both carriers are supported the tie rods, the securing means for the respective tool parts are provided in the tool space between the carriers. In consequence, the securing means are exposed to damage by the tool and they obstruct access to the tool parts between the tie rods. Experience has also shown that their mechanical strength, leaves much to be desired, particularly since they have to absorb the full tool opening force, for example, when the tool parts are jammed, and they can hardly be made sufficiently stable without incurring large expenses.

SUMMARY OF THE INVENTION

The present invention avoids the drawbacks of the prior art. In accordance with the invention, guide bolts are provided which extend perpendicularly to the tool parting plane and project from the back side of each tool part, through corresponding bores in the tool carrier, up to the range of action of cross-slides which are mounted and guided on the respective tool carrier, on the side remote from the tool. In their engaged position, the slides press the tool part against the tool carrier by exerting a wedge pressure on the guide bolt.

It is useful to provide the guide bolt with a web portion formed by two flats which are parallel to each other and which are embraced by a fork portion thereof in the engaged position of the cross-slide. It is also advantageous to design the bolt shoulders bounding the web at the outside of the bolt, as well as the opposite front faces of the fork portion of the slide as cooperating wedge surfaces. The slides may be actuated mechanically, hydraulically or pneumatically.

Since all of the securing elements are located outside of the tool space, the tool parts remain fully accessible. Damaging of the securing elements by the tool parts themselves is made impossible and since the cross-sections of the guide bolts may easily be proportioned so as to withstand the maximum tool opening forces to be expected, this securing mechanism is superior in strength to the prior art.

Accordingly, an object of the invention is to provide an improved device for holding a tool part to a tool carrier, particularly for injection molding machines, which includes a guide bolt which is secured to the workpiece so that it projects outwardly from the rear of the workpiece and is engageable in a bore of the tool carrier and projects from the rear surface of the tool carrier and, wherein, slide means mounted on the tool carrier are engageable with the guide bolt and act upon wet surfaces which are defined therebetween to urge the bolt with the workpiece in a direction to seat the workpiece firmly on the carrier.

A further object of the invention is to provide a device for mounting a workpiece on a tool carrier which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
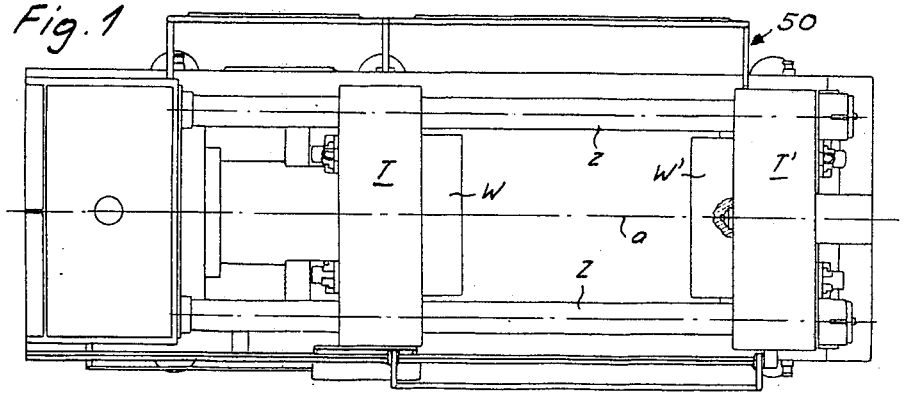
FIG. 1 is a top plan view of the working zone of an injection molding machine for plastics which includes an arrangement for supporting workpieces, in accordance with the invention.
Figure 5:
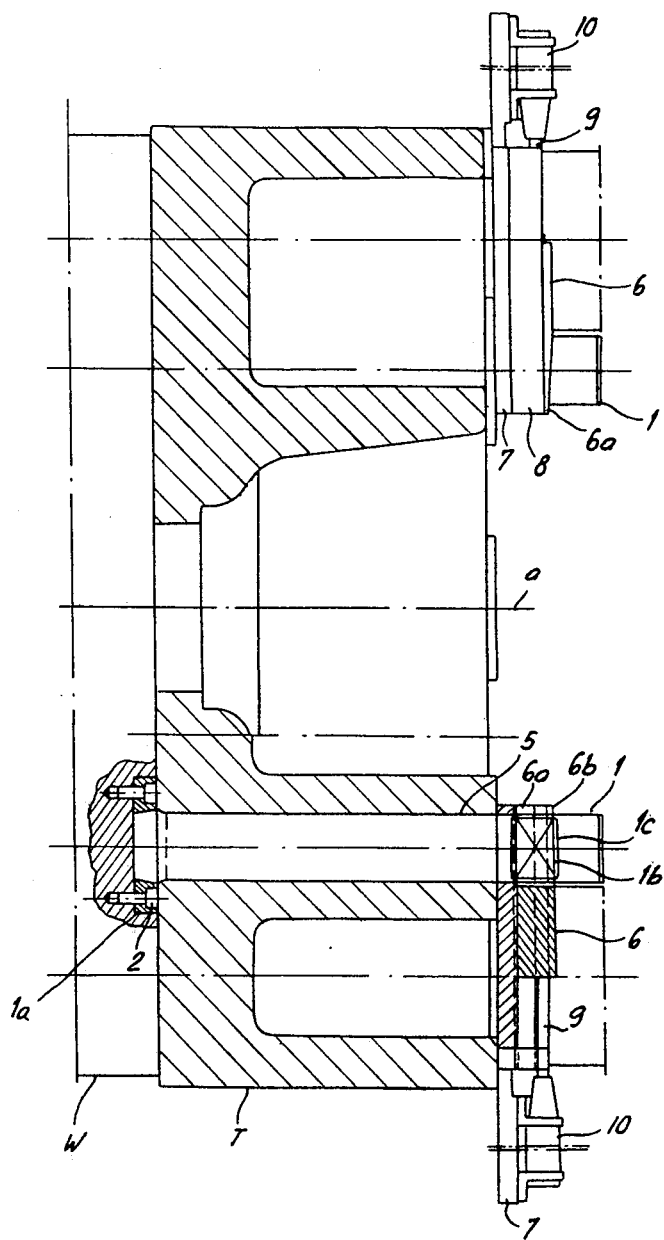
FIG. 5 is a section taken along the line A—A of FIG. 3.

Referring to the drawings in particular, the invention embodied therein, comprises a device for holding a tool part W of an injection molding machine, generally designated 50, to a tool carrier T. In FIG. 1, a fixed tool carrier T and a movable tool carrier T' are shown, together with the associated tool parts W and W'. Tool parts W and W' are held to the tool carrier by an improved arrangement which, in accordance with the invention, includes a guide bolt 1 which, as shown in FIG. 5, is secured to the tool part rear face through the medium of a connecting flange or head 1a and securing screws or bolts 2. Guide bolt 1 projects outwardly from the rear face of the tool part and is engageable in a bore 5 of a tool carrier T. The outer face projects beyond the rear face of the tool carrier and it is secured by slide means 6 which, through acting wedging surfaces defined between the slide means and the bolt 1, effect an inward movement of the tool part toward the tool carrier and a firm mounting thereon.

The injection molding machine for plastics partly shown in FIG. 1 comprises the usual two tool carriers T which are supported by four tie rods Z and to which, on their sides opposite each other, the two tool parts W are detachably secured. Since, as to the manner of securing the tools, the two tool carriers T are designed identically, only one of the carriers with the associated securing means, will be described in the following description.

Figure 2:
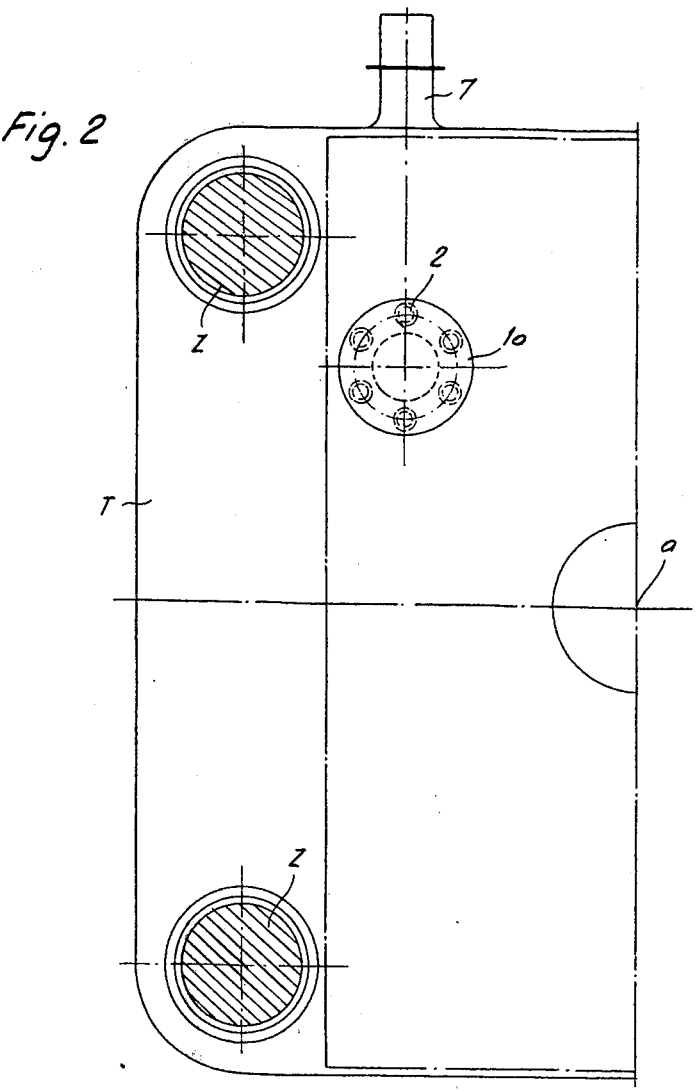
FIG. 2 is an enlarged partial top plan and partial sectional view of a portion of the tool carrier.
Figure 4:
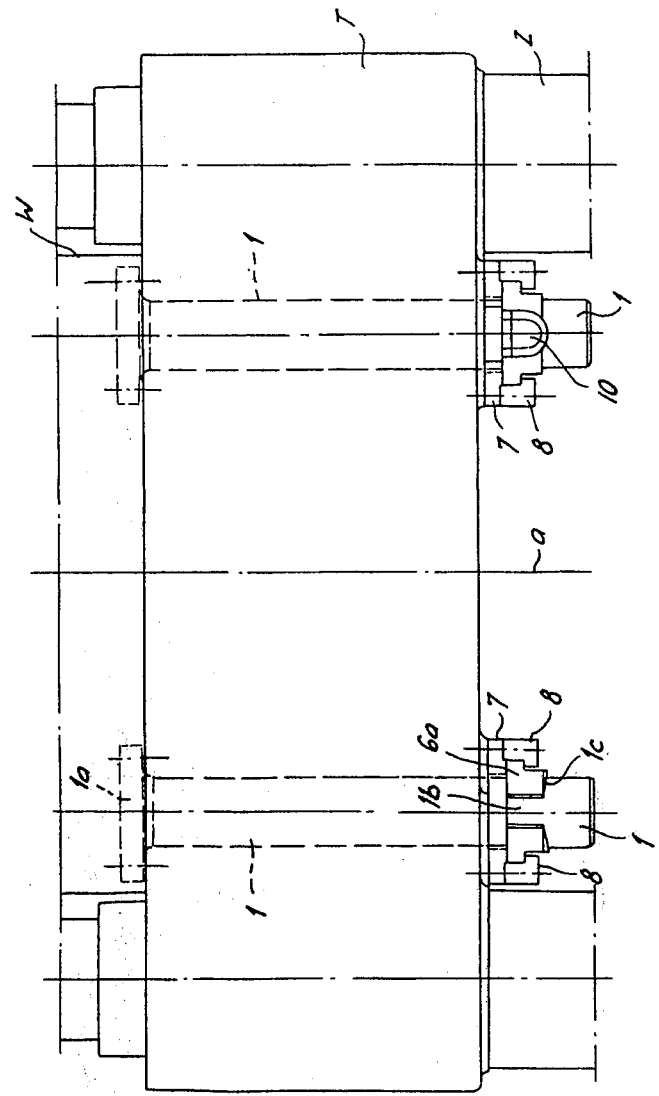
FIG. 4 is an end elevational view taken in the direction of the arrow B of the tool carrier shown in FIG. 3.

As seen from FIGS. 2, 4 and 5, the heads 1a of two guide bolts 1, which are disposed in diametral opposition to each other relative to the tool axis a (here injection axis), are secured by means of screws 2 to the back side of the respective tool part W (one half of the mold), i.e., to the side facing tool carrier T. Each guide bolt 1 projects through a corresponding bore 5 provided in tool carrier T. On the end portion of guide bolt 1 projecting beyond the back side of the tool carrier, a web portion 1b is formed on the bolt by two flats which are parellel to each other. The shoulders 1c (FIG. 5) bounding this web portion at the bolt end side are wedge surfaces which are inclined relative to the plane of the carrier.

A baseplate 7, comprising lateral guide jaws 8 is secured to tool carrier T and forms part of slide means which includes a slide 6 which is guided on the jaws 8 on the tool carrier. The working portion 6a of slide 6 has the shape of a fork, the legs of which are spaced from each other so as to fit the web portion 1b formed by the flats on bolt 1. The front faces 6b of the fork portion of slide 6 define wedge surface means along with opposite and corresponding shoulder surfaces 1c of the bolt. On the slide end remote from fork portion 6a, a piston rod 9 of a hydraulic or pneumatic piston actuator 10 is connected for moving slide 6 into and out of the engaged position thereof.

Figure 3:
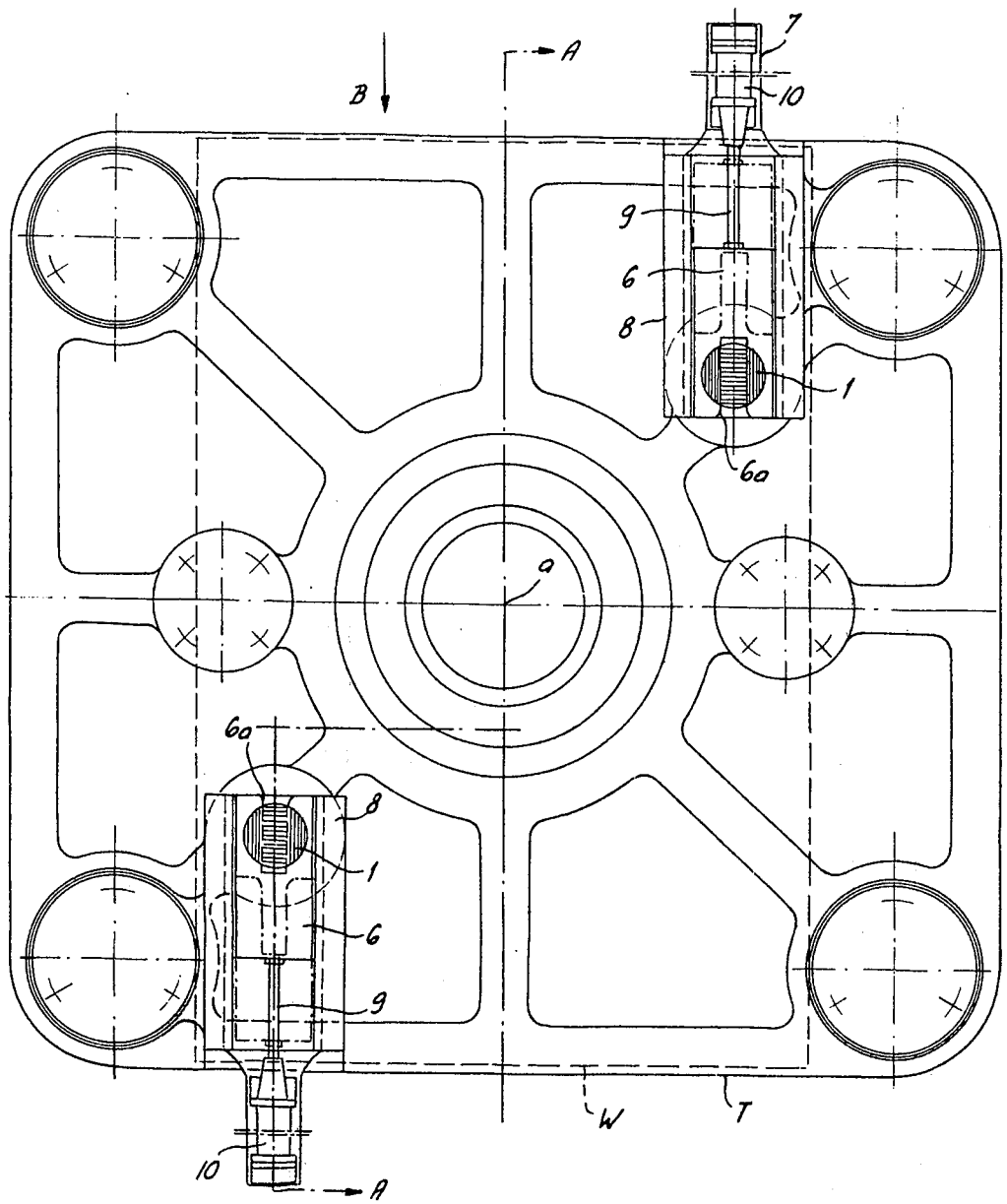
FIG. 3 is a side elevational view of the tool carrier.

The tools of the injection molding machine are mounted as follows. First, the two guide bolts 1 are secured to tool part W by means of scres 2. Slides 6 are in their retracted position indicated in dash-dotted lines in FIG. 3. Now, by means of a crab for example, tool part W, with guide bolts 1 secured thereto, is moved into engagement with tool carrier T. In this position, in which tool part W is engaged with tool carrier T, slides 6 can be moved into their position shown in solid lines in FIG. 3. In this position, due to the interengaging wedge surfaces 1c, 6b, which slide on each other, tool part W is firmly pressed against tool carrier T. The tool opening force is transmitted by web portion 1b of guide bolt 1 to slide 6.

The securing elements above described are mounted in the same manner on both tool parts W and W' and on the movable tool carrier T, as well as on the fixed carrier T'. In this way, the desired mechanical strength is ensured in a most simple manner by a satisfactory dimensioning of the guide bolts, their web portions and the slides. The tools can be mounted rapidly and easily in addition.

With the exception of the bolt head countersunk in the tool part, all elements of the securing means are located outside of the tool space which is situated between tool carriers T and T' and thus do not hinder the free access to the tool between tie rods 2 in any way. Further, the securing mechanism comprises simple elements and piston actuators 10, which are permanently connected to slides 6 by piston rods 9, are firmly screwed to baseplates 7 which, in turn, are firmly screwed to tool carrier T.

While a specific embodiment of the invention has been shown and described in detail to illustrate the application of the principles of the invention, it will be understood that the invention may be embodied otherwise without departing from such principles.

What is claimed is:

1. A tool carrier mechanism for injection molding machines for securing a tool part to a tool carrier, comprising a guide bolt having means for connecting it to the tool part so that it projects outwardly from the rear of the tool part, a tool carrier having a bore there through for receiving said guide bolt and having a front face against which the rear of the tool part is engageable and having an opposite rear face beyond which said guide bolt projects, slide means mounted on said tool carrier adjacent said rear face of said tool carrier and being movable toward and away from said guide bolt for engagement and disengagement therefrom, and wedge surface means defined between said guide bolt and said slide effecting an inward movement of said guide bolt with the tool part to exert an inward pressure engagement of the tool part with said tool carrier.

2. A tool carrier mechanism, according to claim 1, wherein said guide bolt has an end which projects beyond a rear face of the tool carrier formed by flats which are parallel to each other and which in the engaged position of said guide bolt with said slide means are embraced by said slide means, said slide means including a fork portion extending into engagement with respective flats, said engageable portions having cooperating wedge surfaces defining said work surface means.

3. A tool carrier mechanism, according to claim 1, including a baseplate on said carrier, said slide means including a slide engageable on said base part and a fluid-pressure operated motor connected to said slide to move said slide toward and away from said bolt.

4. A tool carrier mechanism, according to claim 1, including at least one additional guide bolt having means for connecting it to a tool part and wherein said carrier has an additional bore for receiving said guide bolt and said slide means includes a slide engageable with said additional guide bolt.

* * * * *